United States Patent
Remington et al.

(10) Patent No.: US 12,087,961 B2
(45) Date of Patent: Sep. 10, 2024

(54) BATTERY-CENTRIC VIRTUAL GRID (VG) SYSTEM

(71) Applicant: LAND ENERGY, INC, Cleveland, OH (US)

(72) Inventors: George Henry Remington, Bay Village, OH (US); Evan Painter, Cleveland, OH (US); Zack Simmering, Mansfield, OH (US); Scott Colosimo, Cleveland, OH (US); Garvin Seto, Cleveland, OH (US)

(73) Assignee: LAND ENERGY, INC, Cleveland, OH (US)

( * ) Notice: Subject to any disclaimer, the term of this patent is extended or adjusted under 35 U.S.C. 154(b) by 185 days.

(21) Appl. No.: 17/931,329

(22) Filed: Sep. 12, 2022

(65) Prior Publication Data

US 2023/0077449 A1   Mar. 16, 2023

Related U.S. Application Data

(60) Provisional application No. 63/242,819, filed on Sep. 10, 2021.

(51) Int. Cl.
*H01M 50/258* (2021.01)
*B60L 50/64* (2019.01)
(Continued)

(52) U.S. Cl.
CPC ......... *H01M 50/258* (2021.01); *B60L 50/64* (2019.02); *B60L 53/80* (2019.02); *B62J 43/30* (2020.02);
(Continued)

(58) Field of Classification Search
CPC .................................................. H01M 50/256
(Continued)

(56) References Cited

U.S. PATENT DOCUMENTS 10,128,669 B2 *   11/2018   Lim ........................ H02J 50/10
2018/0331546 A1   11/2018   Kutkut et al.

FOREIGN PATENT DOCUMENTS

WO   2015001930 A1   1/2015
WO   2017186372 A1   11/2017

OTHER PUBLICATIONS

International Preliminary Report on Patentability for corresponding PCT International Application No. PCT/US2022/076257 mailed Mar. 21, 2024.
(Continued)

*Primary Examiner* — Vincent Q Nguyen
(74) *Attorney, Agent, or Firm* — Renner, Otto, Boisselle & Sklar, LLP

(57) ABSTRACT

A battery-centric virtual grid system may include battery modules, each including: one or more battery cells, one or more processors that obtain performance information from the one or more battery cells, the one or more processors configured to identify a respective device being powered by the respective modules from the plurality based on the respective performance information and to determine characteristics of the respective device being powered by the respective module from the plurality based on the performance information or configured to receive data from the respective device powered by the module from the plurality, the one or more transceivers configured to remotely receive and transmit data, thus the respective device becoming part of an IOT network via the respective module, and an enclosure at least partially enclosing the one or more battery cells, the one or more module processors, and the one or more transceivers.

22 Claims, 4 Drawing Sheets

(51) Int. Cl.
  *B60L 53/80* (2019.01)
  *B62J 43/30* (2020.01)
  *B62J 45/20* (2020.01)
  *B62J 50/22* (2020.01)
  *B62M 11/02* (2006.01)
  *G01R 31/36* (2020.01)
  *G01R 31/367* (2019.01)
  *G01R 31/396* (2019.01)
  *G01S 19/42* (2010.01)
  *H01M 10/42* (2006.01)
  *H01M 50/204* (2021.01)
  *H01M 50/209* (2021.01)
  *H01M 50/242* (2021.01)
  *H01M 50/249* (2021.01)
  *H01M 50/251* (2021.01)
  *H01M 50/256* (2021.01)
  *H02J 9/06* (2006.01)
  *H02J 13/00* (2006.01)

(52) U.S. Cl.
  CPC ............. *B62J 45/20* (2020.02); *B62J 50/22* (2020.02); *B62M 11/02* (2013.01); *G01R 31/3646* (2019.01); *G01R 31/367* (2019.01); *G01R 31/396* (2019.01); *G01S 19/42* (2013.01); *H01M 10/425* (2013.01); *H01M 50/204* (2021.01); *H01M 50/209* (2021.01); *H01M 50/242* (2021.01); *H01M 50/249* (2021.01); *H01M 50/251* (2021.01); *H01M 50/256* (2021.01); *H02J 9/06* (2013.01); *H02J 13/00022* (2020.01); *H01M 2010/4271* (2013.01); *H01M 2010/4278* (2013.01); *H01M 2220/10* (2013.01); *H01M 2220/20* (2013.01)

(58) Field of Classification Search
  USPC .......................................... 324/426, 430–435
  See application file for complete search history.

(56) References Cited

OTHER PUBLICATIONS

International Search Report and Written Opinion mailed Jan. 26, 2323 in corresponding International Application No. PCT/US2022/076255.

* cited by examiner

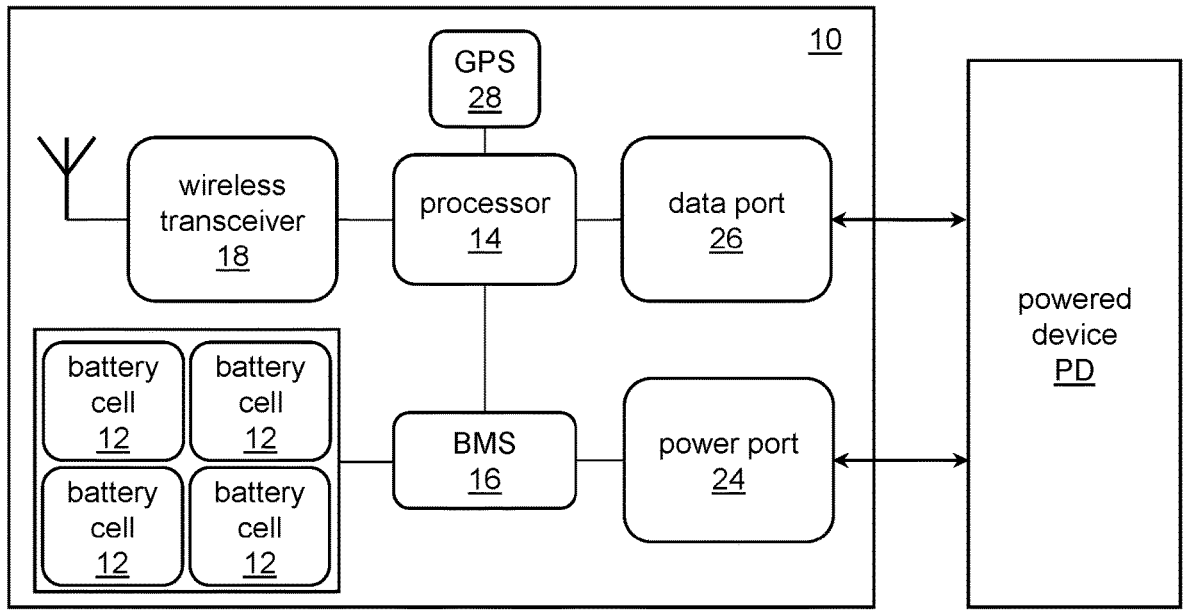
FIG. 2A
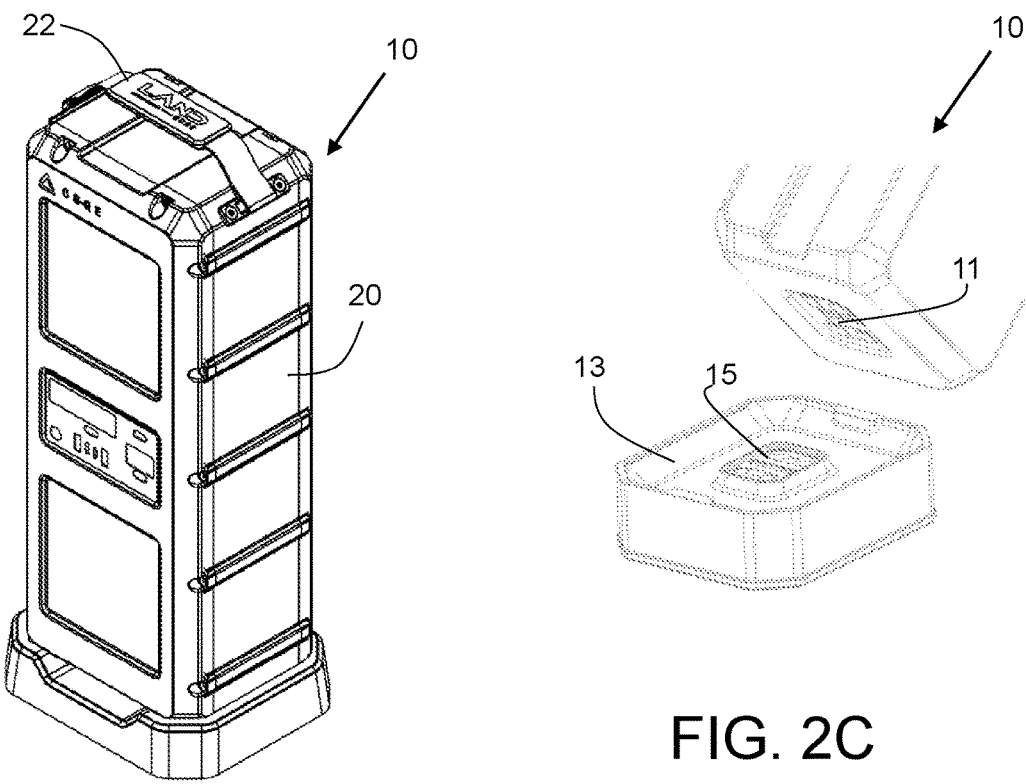
FIG. 2B
FIG. 2C

BATTERY-CENTRIC VIRTUAL GRID (VG) SYSTEM

RELATED APPLICATION

This application claims priority to U.S. Provisional Patent Application No. 63/242,819, filed on Sep. 10, 2021, and titled "BATTERY SYSTEM AND BATTERY POWERED VEHICLE," the entirety of which is incorporated herein by reference.

FIELD OF INVENTION

The present invention relates to battery powered devices, in particular to a battery-centric Virtual Grid (VG) system.

BACKGROUND

Conventionally, electric vehicles (e.g., battery powered) were charged in a manner similar to a manner used to charge most rechargeable battery powered devices. That is, the operator plugs a charger for the vehicle's battery into an electrical outlet connected to a utility's electric power grid and the vehicle's charger charges the vehicle's battery. A vehicle's charger may contain explicit logic or components to alter charge rate in order to prolong the life of the vehicle's battery, but not significant other logic.

In another technology area, Internet of Things (IoT) devices provide opportunities for monitoring and tracking of the IoT devices and other associated devices. As the number of IoT devices increases, the use of techniques to track and monitor the devices will become more important. Further, it is envisaged that a significant portion of the number of the IoT devices will be battery powered devices.

As it stands there are systems that monitor charge and location of their devices and batteries, but there remain significant challenges and opportunities.

SUMMARY OF THE INVENTION

The present disclosure relates to a battery-centric Virtual Grid (VG) system that allows for the movement of battery modules instead of on the movement of power via a wired grid as prior art grids did. The VG collects data of the battery and the battery-powered device at the battery and interpolates the data to regulate a multiuser database. The system disclosed herein uses battery connectivity innovations to create a conglomerate system of DC devices, the Virtual Grid (VG). The VG acts as a power management system for all batteries and battery-powered devices connected to those batteries. Currently, there may be systems that monitor charge and location of their corresponding devices and batteries, but they do not interpolate the data in such a way that it can regulate a multiuser database. The system disclosed herein may provide data and feedback to VG users. This allows VG users to utilize their own data, as well as the conglomerate data, to grow and/or shrink their portion of the grid as needed.

In one embodiment, a battery module may be fitted with wireless connectivity that allows the battery module to communicate in the VG Cloud. The VG Cloud may allow end users or the grid to control the output and charging of the respective battery, as well as report diagnostic information. The VG Cloud may allow end users or the grid to understand and control, not just the specific battery, but also the corresponding battery-powered device as well as other batteries and devices in the logical vicinity of the specific battery.

Wide deployment of VG batteries as a system allows for intercommunication between devices of various sorts, making possible simplified, centralized controlled and monitoring of batteries and powered devices, a virtual grid. Environments in which VG batteries may be deployed include home or commercial device power storage, device power backup, vehicle power.

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

BRIEF DESCRIPTION OF THE DRAWINGS

FIG. 2A illustrates a block diagram of an exemplary battery module for the system of FIG. 1.

FIG. 2B illustrates a perspective view of the exemplary battery module.

FIG. 2C illustrates a perspective view of the exemplary battery module and a plug in base.

DETAILED DESCRIPTION

Figure 1:
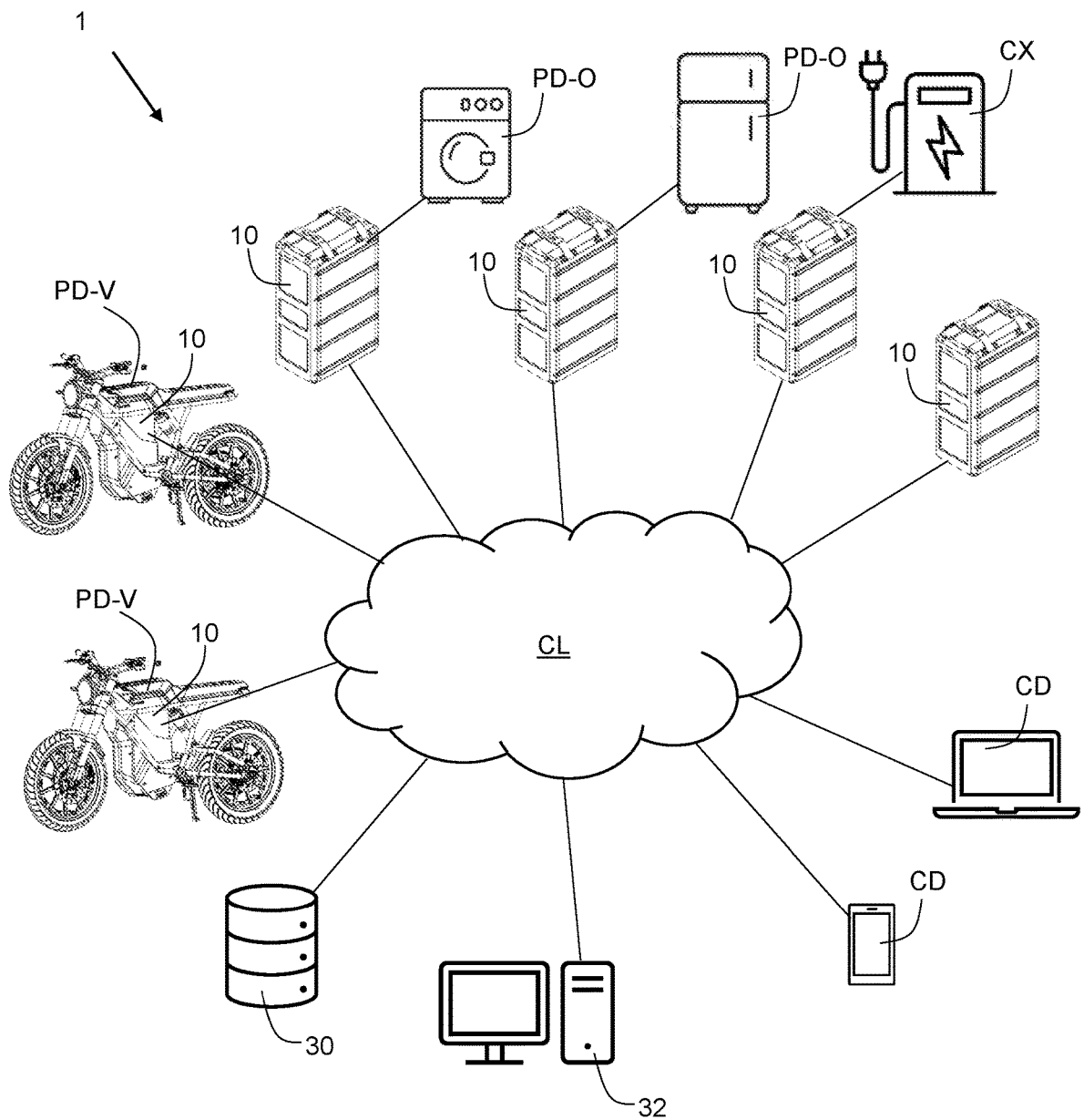
FIG. 1 illustrates a schematic diagram of an exemplary battery-centric Virtual Grid (VG) system.

FIG. 1 illustrates an exemplary battery-centric virtual grid (VG) system 1. The VG system 1 is referred herein as battery-centric because battery modules 10 allow for the construction of the VG system 1, as described in detail below. The system 1 includes multiple battery modules 10.

FIGS. 2A-2C illustrates a block diagram and profile views of an exemplary battery module 10. The battery module 10 may include one or more battery cells 12, one or more module processors 14, a battery management system (BMS) 16, a wireless transceiver 18, a power port 24, and a data port 26. The battery module may also include an enclosure 20 for at least partially housing the one or more battery cells 12, one or more module processors 14, battery management system (BMS) 16, wireless transceiver 18, power port 24, and data port 26.

The battery module 10 may include the one or more battery cells 12 electrically organized to enable delivery of targeted range of voltage and current for a duration of time against expected load scenarios. The number and capacity of the battery cells may result in capacity for the battery module 10 in the range of 1.0 kWh to 5.0 kWh. In one embodiment, the number and capacity of the battery cells results in 1.8 kWh capacity for the battery module 10. In another embodiment, the number and capacity of the battery cells results in 3.6 kWh capacity for the battery module 10. In yet another embodiment, the number and capacity of the battery cells results in 5.0 kWh capacity for the battery module 10. In some embodiments, the number and capacity of the battery cells may result in capacity for the battery module 10 in a range lower than 1.0 kWh or higher than 5.0 kWh. The battery cells 12 may be, for example, lithium-ion rechargeable cells, but may be other types of rechargeable cells.

The battery module 10 may include one or more module processors 14 operably connected to the one or more battery cells 12 to obtain performance information from the one or more battery cells 12. In the illustrated embodiment of FIG. 2A, the processor 14 is operably connected to the battery cells 12 via the battery management system (BMS) 16. The BMS 16 may perform oversight of the battery cells 12 including, for example, monitoring parameters (e.g., voltage, current, temperature, etc.), providing battery protection (e.g., overcurrent, short circuit, over-temperature, etc.), preventing operation outside a battery cell's ratings, estimating a battery cell's operational state, continually optimizing battery performance, reporting operational status to the processor 14, etc. The processor 14 is operably connected to the BMS 16 to obtain the performance information of the battery cells 12. Performance information in this context includes all information the BMS 16 may obtain from the battery module 10 including the battery cells 12 including, for example, voltage, current, temperature, abnormal conditions such as overcurrent, short circuit, over-temperature, battery cell's operational state, etc.

In some cases, power may be need monitored when being passed through instead of being drawn from the battery module 10. For example, in a scenario where the battery module 10 is fully charged and commercial grid power is low, a power company (e.g., through the remote server 32) or the user (e.g., through the computing devices CD) may instruct the battery module 10 to not discharge but instead act as a pass through for grid power to the load connected to the power port 24. The BMS 16 or the processor 14 (or their combination) may still monitor power delivery and gather data accordingly. Such data would be included in the performance information.

The battery module 10 may also include a wireless transceiver 18 operably connected to the processor 14 to remotely transmit data including the performance information from the battery cells 12. The wireless transceiver 18 may include a transmitter, a receiver, or both and, thus, it may exclusively transmit information, exclusively receive information, or it may transmit and receive information. The wireless transceiver 18 may be a broadband cellular network (e.g., 3G, 4G, 5G, etc.) transceiver or a transceiver employing other local area network (LAN) or wide area network (WAN) technologies. The wireless transceiver 18 may, for example, communicate in a network using Wi-Fi, Bluetooth, satellite communication, etc.

As best illustrated in FIGS. 2B and 2C, the battery module 10 may also include an enclosure 20 at least partially enclosing the one or more battery cells 12, the one or more module processors 14, and the wireless transceiver 18. The enclosure 20 may have mounted to or built thereupon one or more handles 22 for a user to grab to transport the module 10. The weight, size, and form factor of the module 10 is designed with ergonomics in mind to be "human-sized." That is, the module 10 may be designed to be pluggable/unpluggable and transportable by a single person: of such size, shape, and weight that a single person may carry it relatively comfortably and without injury.

Regarding weight, the module may be designed to comply with maximum lifting weight regulations or guidelines such as, for example, the Revised National Institute of Occupational Safety and Health (NIOSH) Lifting Equation (2021), guidelines for evaluating two-handed manual lifting tasks. Such guidelines define a Recommended Weight Limit (RWL) as the weight of the load that nearly all healthy people (typically workers) can lift over a substantial period of time (e.g., eight hours) without an increased risk of developing lower back pain. In some guidelines, the maximum weight to be lifted with two hands, under ideal conditions, is 51 pounds. In some guidelines, the maximum weight to be lifted with two hands, under ideal conditions, is 40 pounds. In one embodiment, the battery module 10 is designed to weight 51 pounds or less. In another embodiment, the battery module 10 is designed to weight 40 pounds or less. In yet another embodiment, the battery module 10 is designed to weigh 25 pounds or less. In some embodiments, the battery module 10 is designed to weight in a range from 40 pounds to 51 pounds. In some embodiments, the battery module 10 is designed to weight in a range lower than 40 pounds or higher than 51 pounds.

Regarding size and form factor, the module 10 may be designed to have a generally "suit case" rectangular form factor with the handle 22 installed or built thereupon at one end of the module 10. The dimensions of the module 10 may be height in the range of 12 inches to 24 inches, width in the range of 6 inches to 12 inches, and depth in the range of 4 inches to 8 inches. In one embodiment, the module 10 may be 16 inches tall, 9.5 inches wide, and 5.5 inches deep. In some embodiments, the battery module 10 is designed with height in a range shorter than 12 inches or taller than 24 inches, width in a range narrower than 6 inches or wider than 12 inches, and depth in a range shallower than 4 inches or deeper than 8 inches.

Returning to FIG. 2A, the module 10 may include a power port 24 for connecting the battery module 10 to a powered device PD. The powered device PD may correspond to a vehicle, a home appliance, etc. as described in detail below. The power port 24 may also serve as a recharge port for the battery module 10. That is, since the battery module 10 is removable and transportable, a user may plug in the power port 24 of the battery module 10 in, for example, a vehicle's power port to power the vehicle, remove the battery module 10 from the vehicle, transport the battery module 10 to a charging station, and plug the battery module 10 to the charging station to be charged via the power port 24.

The battery module 10 may also include a data port 26 to connect the battery module 10 to a data buss of the powered device PD. For example, if the powered device PD is a vehicle, the data port 26 may be connected to a CAN bus (ISO 11898 Standard) of the vehicle. Similarly, the data port 26 may be connected to other communications systems such as, for example, wired standard (RS485, etc.) as well as wireless standard (Wi-Fi, Bluetooth, ZigBee, WiMax, etc.) communications systems. Thus, the data port 26 may be wired port, a wireless port, or combinations thereof.

As best shown in FIG. 2C, the battery module 10 may have a connector 11 to plug in to a connector 15 of a base 13. The connector 11 may incorporate the power port 24 and data port 26. The base 13 may be a stand-alone charging/power distribution port connected to a building's power distribution system. The base 13 may also be a vehicle battery dock or receiver for the vehicle PD-V.

The battery module 10 may also include a global position system (GPS) 28 receiver operably connected to the processor 14 to communicate to the processor 14 a geographical location of the battery module 10. In some embodiments, the battery module 10 may employ techniques (e.g., Bluetooth communication with GPS-equipped mobile phone, Wi-Fi Positioning System (WPS), etc.) instead of or in addition to the to the GPS 28 to obtain the geographical location of the battery module 10.

Returning to FIG. 1, the system 1 includes a constellation of battery modules 10.

Some battery modules 10 may be connected to vehicles PD-V to power the vehicles, to serve as one-way or two-way vehicle wireless data transmission devices, and to serve as the vehicles' link to the IoT. The battery module 10 power capacity allows for powering of the electric vehicle PD-V via the power port 24. The BMS 16 of the battery module may also allow for the collection of vehicle and battery performance data. The GPS 28 may be used to obtain location data of the vehicle PD-V and whether the battery module 10 (and hence the vehicle PD-V) is stationary or moving, etc. The battery module 10 may also be connected to a vehicle data system of the electric vehicle PD-V via the data port 26. The wireless transmitter 18 of the battery module 10 may transmit the collected data via the cloud CL to be stored in a database 30. Vehicles PD-V may include any transportation device including two-wheeled, three-wheeled, four-wheeled, etc.

Some battery modules 10 may be connected to other powered devices PD-O such as home appliances, etc. Although in the illustrated embodiment of FIG. 1, the battery modules 10 are illustrated as connected directly to the home appliances PD-O, the battery modules 10 may be connected to a DC (or, via an inverter, an AC) home power system to which the home appliances PD-O may be connected. The battery modules 10 may power those devices PD-O, serve as one-way or two-way appliance wireless data transmission devices, and serve as the appliances' link to the IoT. The battery module 10 power capacity allows for powering of the appliances PD-O via the power port 24. The BMS 16 of the battery module may also allow for the collection of battery and appliance performance data. The GPS 28 may be used to obtain location data of the device PD-O. For some equipped appliances, the battery module 10 may also be connected to an appliance data system of the appliances PD-O via the data port 26. The wireless transmitter 18 of the battery module 10 may transmit the collected data via the cloud CL to be stored in the database 30.

Some battery modules 10 may be in the process of being recharged by charger CX. Although in the illustrated embodiment of FIG. 1, the battery modules 10 are illustrated as connected directly to the charger CX, the battery modules 10 may be connected to a DC (or, via a rectifier, an AC) home power system to which the charger CX may be connected. The battery modules 10 may be recharged by the charger CX, serve as one-way or two-way charger wireless data transmission devices, and serve as the charger's link to the IoT. The BMS 16 of the battery module 10 may also allow for the collection of battery and charger performance data. The GPS 28 may be used to obtain location data of the charger CX, etc. For some equipped chargers, the battery module 10 may also be connected to a charger data system of the charger CX via the data port 26. The wireless transmitter 18 of the battery module 10 may transmit the collected data via the cloud CL to be stored in the database 30.

Some battery modules 10 may be temporarily disconnected from devices such as vehicles PD-V, home appliances PD-O, or chargers CX, etc. Even when not powering other devices or being charged, the battery modules 10 may collect their own data (location data, how much charge remains in the battery, etc.) The BMS 16 of the battery module 10 may allow for the collection of the battery's performance data. The GPS 28 may be used to obtain location and whether the battery module 10 is stationary or being moved, etc. Thus, even when not powering other devices or being charged, the battery modules 10 may serve as one-way or two-way wireless data transmission devices for their own data (e.g., location data, whether the battery is being used (no), how much charge remains in the battery, etc.) and serve as its own link to the IoT. The wireless transmitter 18 of the battery module 10 may transmit the collected data via the cloud CL to be stored in the database 30.

In this way, the database 30 has stored therein data from all the battery modules 10 and their corresponding powered devices PD-V, PD-O and chargers CX. Each battery module 10 ever manufactured may have a corresponding field in the database 30 such that the system 1 may have up-to-date and detailed information of every battery module 10 in the fleet and the corresponding devices connected to the battery module 10.

The system 1 may also include a remote server 32 that communicates with the battery modules 10 or the database 30 including receiving the data including the performance information. That is, the battery modules 10 may use their wireless transceiver 18 to communicate the data including the performance information to the cloud CL and the server 30, also connected to the cloud CL, may receive the data including the performance information either directly from the battery modules 10 or from the database 30.

In reference to FIG. 2A, in cases in which the powered device PD has a data port of its own compatible with the data port 26, that connection may be used to obtain data including performance information of the powered device PD. The connection may also be used to control the powered device PD via the battery module 10. For example, the demand for energy may exceed the virtual grid's ability to supply it, potentially causing brownouts or blackouts. A grid operator may offset the imbalance by reducing the amount of electricity being consumed when demand exceeds supply. The remote server 32 (or user computing devices CD described below) may effect such demand response device control on the powered device PD by communicating with the powered device PD through the battery module 10.

In cases in which the powered device PD does not have a data port compatible with the data port 26, the system 1 of FIG. 1 may obtain data including characteristics of the powered devices PD via analysis of power consumption as detected at the power port 24. Characteristics in this context includes all information the BMS 16 may derive from the analysis of power consumption as detected at the power port 24 including, for example, identity (type of device, model, etc.), settings, performance characteristics such as power consumption, abnormal conditions such as overcurrent, short circuit, etc. of the powered devices PD.

In one embodiment, the system 1 uses techniques for identifying powered devices PD and determining information about state changes of powered devices PD in, for example, a home. One source of data in determining information about powered devices PD in a home may be the electrical connection at power port 24. The BMS 16, operably connected to the power port 24, may use disaggregation techniques to determine information about individual powered devices PD in the home.

In one embodiment, the combination of the processor 14 and the BMS 16 may use a current, voltage, or power signature detected at the power port 24 to identify a type of the powered device PD being powered by the corresponding battery module 10. More specifically, electrical events or short term or long term waveforms or spectrum of, for example, voltage or load current may be associated with an event type or a device type. For example, electrical events may be identified specifically as corresponding to certain types of powered devices PD, such as a motor, a heating element, a power supply for a consumer electronic device, a battery charger, a lamp, or the like. Later processing by the BMS 16, the processor 14, the remote server 32, or some other computing device may use the event type for more efficient and/or accurate identification of powered devices PD.

For example, the BMS 16 may process electrical signals (such as voltage and current) to disaggregate them or to obtain information about individual devices PD in the home connected to the power port 24. For example, BMS 16 may determine device events, such as that a washing machine was turned on at 8:30 am or that the compressor of the refrigerator started at 10:35 am and 11:01 am. BMS 16 may transmit this performance information about device events to the processor 14, the database 30, or to the remote server 32 via the wireless transmitter 18. BMS 16 may also determine raw real-time information about power used by individual devices PD in the home and transmit this real-time information to the database 30 or the remote server 32 via the wireless transmitter 18 for further processing. For example, BMS 16 may determine on predetermined intervals, such as ten second intervals, three second intervals, one second intervals, or sub-second intervals, the power used by multiple devices PD in the home and the battery module 10 may transmit the information.

The electrical events information may be used to identify a device type. Similar techniques may be used to obtain performance information (e.g., event type) of the powered devices PD. This way, the power port 24 may be used to obtain data including performance information of the powered device PD. The power port 24 may also be used to control the powered device PD by, for example, throttling power or cutting power to the powered device PD using the BMS 16. In this way, the power port may be used to effectively convert conventional (i.e., not "smart" or IoT enabled) devices into IoT enabled devices allowing for the smart monitoring and control of such conventional devices. In this way, the remote server 32 (or user computing devices CD described below) may effect, for example, demand response device control on the powered device PD through the battery module 10 even for powered devices PD that do not have an explicit data port compatible with the data port 26.

The system 1 may also provide a user interface accessible to users via computing devices CD such as computers or mobile phones. Via the user interface in the computing devices CD, the system 1 may communicate data including, for example, characteristics of their own battery modules 10 and powered devices PD to users of the system 1. Via the user interface in the computing devices CD, the system 1 may also allow the user to control the battery modules 10 and powered devices PD.

The system 1, then, represents a novel battery-centric Virtual Grid (VG) system that allows for the movement of battery modules 10 instead of on the movement of power via a wired grid as prior art grids did. The VG collects data of the battery module 10 including data of the battery-powered device PD at the battery. The system 1 uses battery connectivity innovations to create a conglomerate system of devices, the Virtual Grid (VG). The VG acts as a power management system for all batteries and battery-powered devices connected to those batteries. The system 1 may provide data and feedback to VG users. This allows VG users to utilize their own data, as well as the conglomerate data, to grow and/or shrink their portion of the grid as needed. The VG may allow end users or the grid to control the output and charging of their respective batteries, as well as report diagnostic information, etc. The VG may allow end users or the grid to understand and control, not just any specific battery module, but also the corresponding battery-powered device as well as other batteries and devices in the logical vicinity of the specific battery module.

Wide deployment of battery modules 10 would allow for intercommunication between devices of various sorts, making possible simplified, centralized controlled and monitoring of batteries and powered devices as a virtual grid. Environments in which battery modules 10 may be deployed include home or commercial device power storage, device power backup, and vehicle power.

The system 1 may be used to map historical power demand and predict future power demand at specific nodes of the grid at specific times. The system 1 may also be used to identify individual and community tendencies, habits, etc. as reflected by power consumption of specific powered devices at specific locations at specific times (e.g., what days of the week and what time of day a user commutes to a specific location, what days of the week and what time of day a user washes clothes, what days of the week and what time of day are the most common for people to wash clothes, etc.) More specifically to power delivery, the system 1 may be used to ensure efficient power delivery by leveraging the data in the database 30.

In one embodiment, the user interface in the computing devices CD may communicate performance information of a battery module 10 correlated to location of the battery module 10.

For example, the system 1 may communicate to a corresponding user that her battery module 10 is low in charge and information regarding a nearly located and fully charged battery module 10. The user may, based on that information, find the fully charged battery module 10 (e.g., at a neighbor's house or at a local store) to replace the discharged battery module 10. In addition, the user may operate the user interface in the computing devices CD to communicate to a second user associated with the fully charged battery module 10 that the first user needs the fully charged battery module 10 and give the second user an opportunity to accept or reject swapping of the fully charged battery module 10 for the low in charge battery module 10.

In another example, upon detection of a battery module 10 being low in charge, the system 1 may automatically communicate to a corresponding user information regarding a nearly located and fully charged battery module 10. The user may, based on that information, find the fully charged battery module 10 to replace the discharged battery module 10. In addition, upon detection of the battery module 10 being low in charge, the system 1 may automatically communicate to a second user associated with the fully charged battery module 10 that the first user needs the fully charged battery module 10 and give the second user an opportunity to accept or reject swapping of the fully charged battery module 10 with the first user.

In another example, a user may use the user interface in the computing devices CD to communicate travel plans along a route in a battery-powered vehicle PD-V. The system 1, upon receiving the travel plans, may calculate appropriate locations along the route (e.g., based on charge remaining in the battery module 10) and may communicate one or more locations of battery modules 10 along the route available to the user for swapping depleted battery modules 10 for charged battery modules 10.

In yet another example, a user whose home may be powered by one or more battery modules 10 (e.g., because of a residential electrical grid outage), may be in a situation where one or more of the battery modules 10 are low in charge or do not have enough charge to power the home or at least vital devices. The user may use the user interface in the computing devices CD to locate nearly located battery modules 10 that are charged and available for swapping.

These and other scenarios are possible because of the capabilities of the battery-centric Virtual Grid (VG) of the present disclosure.

Figure 3:
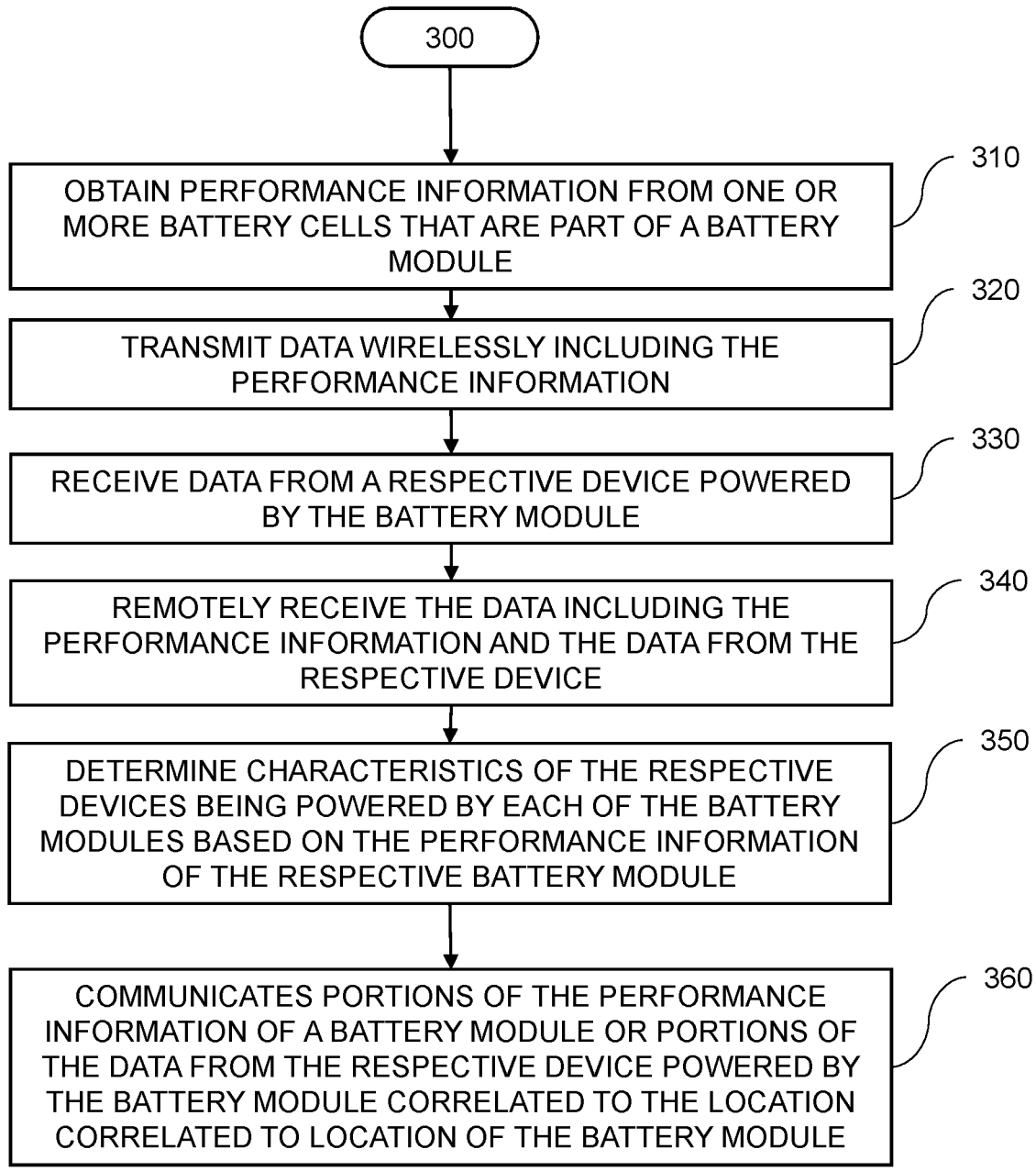
FIG. 3 illustrates a flow diagram for an exemplary method for battery-centric Virtual Grid (VG) system.

Exemplary methods may be better appreciated with reference to the flow diagram of FIG. 3. While for purposes of simplicity of explanation, the illustrated methodologies are shown and described as a series of blocks, it is to be appreciated that the methodologies are not limited by the order of the blocks, as some blocks can occur in different orders or concurrently with other blocks from that shown and described. Moreover, less than all the illustrated blocks may be required to implement an exemplary methodology. Furthermore, additional methodologies, alternative methodologies, or both can employ additional blocks, not illustrated.

In the flow diagrams, blocks denote "processing blocks" that may be implemented with logic. The processing blocks may represent a method step or an apparatus element for performing the method step. The flow diagrams do not depict syntax for any particular programming language, methodology, or style (e.g., procedural, object-oriented). Rather, the flow diagrams illustrate functional information one skilled in the art or artificial intelligence (AI) may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components. It will be appreciated that the processes may be implemented using various programming approaches like machine language, procedural, object oriented or artificial intelligence or machine learning techniques.

FIG. 3 illustrates a flow diagram for an exemplary method 300 for a battery-centric Virtual Grid (VG) system. At 310, the method 300 includes obtaining performance information from one or more battery cells that are part of a battery module. At 320, the method 300 includes the battery module transmitting data wirelessly including the performance information. At 330, the method 300 includes receiving data from a respective device powered by the battery module. In one embodiment, the data from the respective device is derived from the performance information. At 340, the method 300 includes remotely receiving the data including the performance information and the data from the respective device, thus the respective device becoming part of an IOT network via the respective battery module. At 350, the method 300 includes determining characteristics of the respective devices being powered by each of the battery modules in the plurality based on the performance information of the respective battery module. In one embodiment, the method 300, at 360, communicates portions of the performance information of a battery module or portions of the data from the respective device powered by the battery module correlated to the location correlated to location of the battery module.

Figure 4:
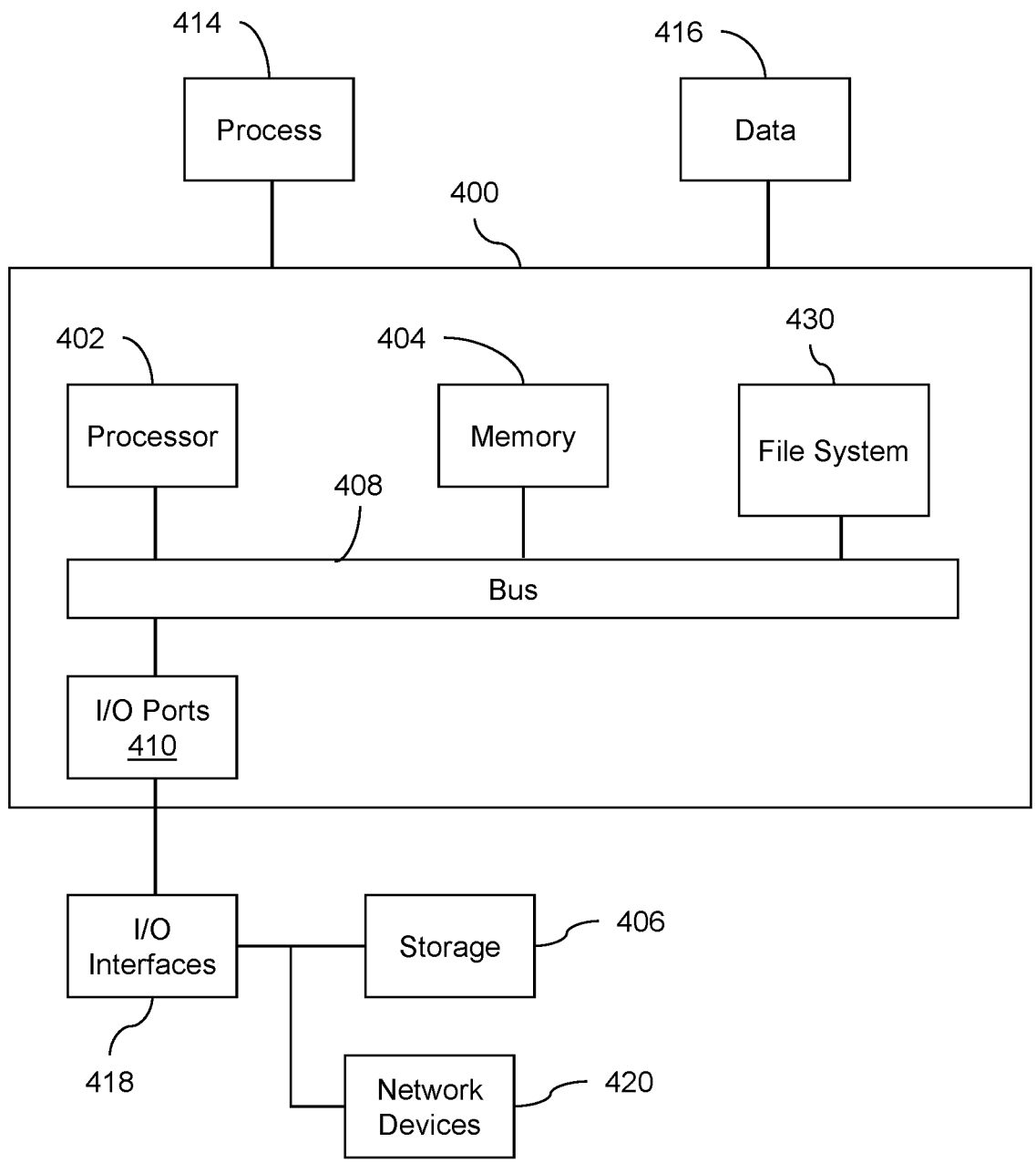
FIG. 4 illustrates a block diagram of an exemplary computing environment for deploying portions of the system of FIG. 1.

FIG. 4 illustrates a block diagram of an exemplary computing environment 400 that may be used to deploy the battery module 10 or the remote server 32 of the present disclosure. The environment 400 includes a processor 402 (e.g., the processor 14), a memory 404, and I/O Ports 410 operably connected by a bus 408. The environment 400 may also include the database 30 or may communicate with the database 30 via the cloud CL.

The processor 402 (e.g., the processor 14) can be a variety of various processors including dual microprocessor and other multi-processor architectures. The memory 404 can include volatile memory or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A storage 406 may be operably connected to the environment 400 via, for example, an I/O Interfaces (e.g., card, device) 418 and an I/O Ports 410. The storage 406 can include, but is not limited to, devices like a magnetic disk drive, a solid state disk drive, a floppy disk drive, a tape drive, a Zip drive, a flash memory card, or a memory stick. Furthermore, the storage 406 can include optical drives like a CD-ROM, a CD recordable drive (CD-R drive), a CD rewriteable drive (CD-RW drive), or a digital video ROM drive (DVD ROM). The memory 404 can store processes 414 or data 416, for example. The storage 406 or memory 404 can store an operating system that controls and allocates resources of the environment 400. The database 30 may reside in the storage 406.

The bus 408 can be a single internal bus interconnect architecture or other bus or mesh architectures. While a single bus is illustrated, it is to be appreciated that environment 400 may communicate with various devices, logics, and peripherals using other busses that are not illustrated (e.g., PCIE, SATA, Infiniband, 1394, USB, Ethernet). The bus 408 can be of a variety of types including, but not limited to, a memory bus or memory controller, a peripheral bus or external bus, a crossbar switch, or a local bus. The local bus can be of varieties including, but not limited to, an industrial standard architecture (ISA) bus, a microchannel architecture (MCA) bus, an extended ISA (EISA) bus, a peripheral component interconnect (PCI) bus, a universal serial (USB) bus, and a small computer systems interface (SCSI) bus.

The environment 400 may interact with input/output devices via I/O Interfaces 418 and I/O Ports 410. Input/output devices can include, but are not limited to, a keyboard, a microphone, a pointing and selection device, cameras, video cards, displays, storage 406, network devices 420, and the like. The I/O Ports 410 can include but are not limited to, serial ports, parallel ports, and USB ports.

The environment 400 (and the battery module 10) can operate in a network environment and thus may be connected to network devices 420 via the I/O Interfaces 418, or the I/O Ports 410. Through the network devices 420, the environment 400 may interact with a network such as the Internet or the cloud CL. Through the network, the environment 400 may be logically connected to remote computers including, for example, a network computer or file server hosting the database 30. The networks with which the environment 400 may interact include, but are not limited to, a local area network (LAN), a wide area network (WAN), and other networks. The network devices 420 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), Zigbee (IEEE 802.15.4) and the like. Similarly, the network devices 420 can connect to WAN technologies including, but not limited to, point to point links, circuit switching networks like integrated services digital networks (ISDN), packet switching networks, satellite communication, and digital subscriber lines (DSL). While individual network types are described, it is to be appreciated that communications via, over, or through a network may include combinations and mixtures of communications.

Definitions

The following includes definitions of selected terms employed herein. The definitions include various examples or forms of components that fall within the scope of a term and that may be used for implementation. The examples are not intended to be limiting. Both singular and plural forms of terms may be within the definitions.

An "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and so on, have been illustrated by describing examples, and while the examples have been described in considerable detail, it is not the intention of the applicants to restrict or in any way limit scope to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

What is claimed is:

1. A battery-centric Virtual Grid (VG) system, comprising:
   a plurality of battery modules, each battery module from the plurality including:
   one or more battery cells totaling at least 1 kWh,
   one or more module processors operably connected to the one or more battery cells to obtain performance information from the one or more battery cells,
   a wireless transmitter operably connected to the one or more module processors and configured to remotely transmit data including the performance information, and
   an enclosure at least partially enclosing the one or more battery cells, the one or more module processors, and the wireless transmitter, the enclosure including a handle for a user to grab to transport the battery module, the battery module weighting 40 lbs. or less; and
   a remote server configured to receive the data including the performance information, wherein the remote server or the one or more module processors is configured to identify respective devices being powered by each of the battery modules in the plurality based on the performance information.

2. The battery-centric Virtual Grid (VG) system of claim 1, wherein the remote server or the one or more module processors is configured to determine characteristics of the respective devices being powered by each of the battery modules in the plurality based on the performance information.

3. The battery-centric Virtual Grid (VG) system of claim 1, comprising:
   a user interface, wherein the remote server or the one or more module processors is configured to determine characteristics of the respective devices being powered by each of the battery modules in the plurality based on the performance information and the user interface is configured to communicate portions of the characteristics to users of the system.

4. The battery-centric Virtual Grid (VG) system of claim 1, comprising:
   a user interface, wherein each battery module from the plurality includes a GPS receiver configured to communicate location of a respective battery module, wherein the user interface is configured to communicate portions of the performance information of one or more battery modules from the plurality to users of the system correlated to the location.

5. The battery-centric Virtual Grid (VG) system of claim 1, comprising:
   a user interface, wherein each battery module from the plurality includes a GPS receiver configured to communicate location of a respective battery module, wherein the user interface is configured to, upon detection of a battery module being low in charge, communicate one or more near locations of battery modules from the plurality not low in charge.

6. The battery-centric Virtual Grid (VG) system of claim 1, comprising:
   a user interface, wherein each battery module from the plurality includes a GPS receiver configured to communicate location of a respective battery module, wherein the user interface is configured to, upon detecting a first battery module from the plurality associated with a first user is low in charge, communicate to a second user associated with a second battery module from the plurality not low in charge that the first user needs the second battery and give the second user an opportunity to accept or reject sharing of the second battery.

7. The battery-centric Virtual Grid (VG) system of claim 1, comprising:
a user interface, wherein each battery module from the plurality includes a GPS receiver configured to communicate location of a respective battery module, wherein the user interface is configured to, upon receiving travel plans along a route for a vehicle, communicate one or more locations of battery modules from the plurality located along the route.

8. The battery-centric Virtual Grid (VG) system of claim 1, wherein the wireless transmitter or a wired transmitter is configured to establish data communication with a respective device the respective battery module is powering, wherein the wireless transmitter is configured to transmit the data from the respective device remotely, thus the respective device becoming part of an IOT network via the respective battery module.

9. A battery-centric Virtual Grid (VG) system, comprising:
a plurality of battery modules, each battery module from the plurality including:
one or more battery cells,
one or more module processors operably connected to the one or more battery cells to obtain performance information from the one or more battery cells,
a wireless transceiver operably connected to the one or more module processors and configured to remotely transmit data including the performance information,
an enclosure at least partially enclosing the one or more battery cells, the one or more module processors, and the wireless transceiver, the enclosure including a handle for a user to grab to transport the battery module, the wireless transceiver or a wired transceiver configured to receive data from a respective device powered by a battery module from the plurality,
a remote server including:
a network connection, and
remote server operably connected to the network connection and to receivers to receive the data including the performance information and the data from the respective device, thus the respective device becoming part of an IOT network via the respective battery module.

10. The battery-centric Virtual Grid (VG) system of claim 9, wherein the remote server or the one or more module processors is configured to determine characteristics of the respective devices being powered by each of the battery modules in the plurality based on the performance information, the data from the respective device derived from the performance information.

11. The battery-centric Virtual Grid (VG) system of claim 9, comprising:
a user interface, wherein the remote server or the one or more module processors is configured to determine characteristics of the respective devices being powered by each of the battery modules in the plurality based on the performance information and the user interface is configured to communicate portions of the characteristics to users of the system.

12. The battery-centric Virtual Grid (VG) system of claim 9, comprising:
a user interface, wherein each battery module from the plurality includes a GPS receiver configured to communicate location of a respective battery module, wherein the user interface is configured to communicate portions of the performance information of one or more battery modules from the plurality or portions of the data from the respective device powered by the battery module from the plurality correlated to the location.

13. The battery-centric Virtual Grid (VG) system of claim 9, comprising:
a user interface, wherein each battery module from the plurality includes a GPS receiver configured to communicate location of a respective battery module, wherein the user interface is configured to, upon detection of a battery module being low in charge, communicate one or more near locations of battery modules from the plurality not low in charge.

14. The battery-centric Virtual Grid (VG) system of claim 9, comprising:
a user interface, wherein each battery module from the plurality includes a GPS receiver configured to communicate location of a respective battery module, wherein the user interface is configured to, upon detecting a first battery module from the plurality associated with a first user is low in charge, communicate to a second user associated with a second battery module from the plurality not low in charge that the first user needs the second battery and give the second user an opportunity to accept or reject sharing of the second battery.

15. The battery-centric Virtual Grid (VG) system of claim 9, comprising:
a user interface, wherein each battery module from the plurality includes a GPS receiver configured to communicate location of a respective battery module, wherein the user interface is configured to, upon receiving travel plans along a route for a vehicle, communicate one or more locations of battery modules from the plurality located along the route.

16. A battery-centric Virtual Grid (VG) system, comprising:
a plurality of modules, each module from the plurality including:
one or more battery cells totaling at least 1 kWh,
one or more module processors operably connected to the one or more battery cells to obtain performance information from the one or more battery cells,
one or more transceivers operably connected to the one or more module processors, the one or more module processors configured to identify a respective device being powered by the respective modules from the plurality based on the respective performance information and to determine characteristics of the respective device being powered by the respective module from the plurality based on the performance information or configured to receive data from the respective device powered by the module from the plurality, the one or more transceivers configured to remotely receive and transmit data, thus the respective device becoming part of an IOT network via the respective module, and
an enclosure at least partially enclosing the one or more battery cells, the one or more module processors, and the one or more transceivers, the module weighting 40 lbs. or less and the enclosure including a handle for a user to grab to transport the module.

17. The battery-centric Virtual Grid (VG) system of claim 16, comprising:
a remote server including remote server operably connected to receivers to receive the data including the performance information or the data from the respective device.

18. The battery-centric Virtual Grid (VG) system of claim 17, comprising:
a user interface, wherein the remote server or the one or more module processors is configured to determine characteristics of the respective devices being powered by each of the modules in the plurality based on the performance information and the user interface is configured to communicate portions of the characteristics to users of the system.

19. The battery-centric Virtual Grid (VG) system of claim 17, comprising:
a user interface, wherein each module from the plurality includes a GPS receiver configured to communicate location of a respective module, wherein the user interface is configured to communicate portions of the performance information of one or more modules from the plurality or portions of the data from the respective device powered by the module from the plurality correlated to the location.

20. The battery-centric Virtual Grid (VG) system of claim 17, comprising:
a user interface, wherein each module from the plurality includes a GPS receiver configured to communicate location of a respective module, wherein the user interface is configured to, upon detection of a module being low in charge, communicate one or more near locations of modules from the plurality not low in charge.

21. The battery-centric Virtual Grid (VG) system of claim 17, comprising:
a user interface, wherein each module from the plurality includes a GPS receiver configured to communicate location of a respective module, wherein the user interface is configured to, upon detecting a first module from the plurality associated with a first user is low in charge, communicate to a second user associated with a second module from the plurality not low in charge that the first user needs the second battery and give the second user an opportunity to accept or reject sharing of the second battery.

22. The battery-centric Virtual Grid (VG) system of claim 17, comprising:
a user interface, wherein each module from the plurality includes a GPS receiver configured to communicate location of a respective module, wherein the user interface is configured to, upon receiving travel plans along a route for a vehicle, communicate one or more locations of modules from the plurality located along the route.

* * * * *